Figure 2:
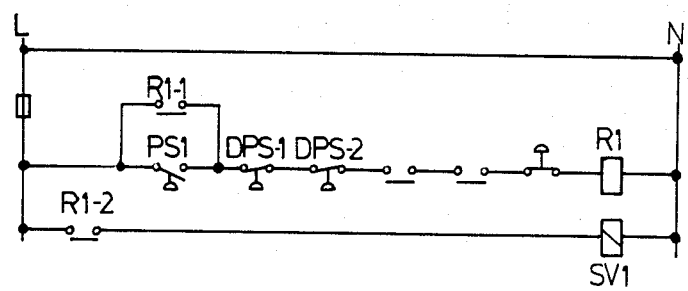

United States Patent [19]

Arav

[11] Patent Number: 4,530,371
[45] Date of Patent: Jul. 23, 1985

[54] CONTROL OF FLUID PRESSURE CIRCUITS

[75] Inventor: Ronnie A. Arav, Bolton, England

[73] Assignee: Beloit Corporation, Beloit, Wis.

[21] Appl. No.: 546,099

[22] Filed: Oct. 27, 1983

[30] Foreign Application Priority Data

Oct. 30, 1982 [GB] United Kingdom ................ 8230928

[51] Int. Cl.³ ............................................ G05D 16/18
[52] U.S. Cl. ..................................... 137/115; 137/87;
251/50
[58] Field of Search ................. 137/87, 100, 115, 114;
60/426; 91/512, 515, 517

[56] References Cited

U.S. PATENT DOCUMENTS

| 2,313,991 | 3/1943 | Fitch | 137/87 X |
| 2,489,823 | 11/1949 | Senninger | 137/87 X |
| 3,154,925 | 11/1964 | DeVita | 60/426 |
| 3,216,441 | 11/1965 | thorsheim | 137/87 X |

Primary Examiner—Robert G. Nilson
Attorney, Agent, or Firm—D. J. Veneman; G. A. Mathews; R. W. Campbell

[57] ABSTRACT

A control system for controlling the pressure and pressure balance in two separate fluid pressure circuits. A valve being employed which comprises a balance piston and a regulating piston. Each of the pistons controls a connection of the first and second fluid pressure circuits to a respective relief line. Fluid pressure is applied to the regulating piston to regulate the pressure in one circuit and the balance piston regulates the pressure in the other circuits in relation to that regulated by the regulating piston. A three position switch and two air pressure regulators or a three position switch, two potentiometers and a servo control valve control the pressure applied to the regulating piston to control the pressures required in the first and second circuits for the desired modes of operation. A further balance valve may be disposed between the first and second circuits. The balance piston of the pressure and balance regulating valve may be provided with shock absorber means to resist the movement thereof in response to minor pressure fluctuations. Similarly, the balance piston of the additional balance valve may be provided with shock absorber means. The relief valve connection controlled by the balance valve of the pressure and balance regulating valve preferably has a triangular shaped opening.

10 Claims, 7 Drawing Figures

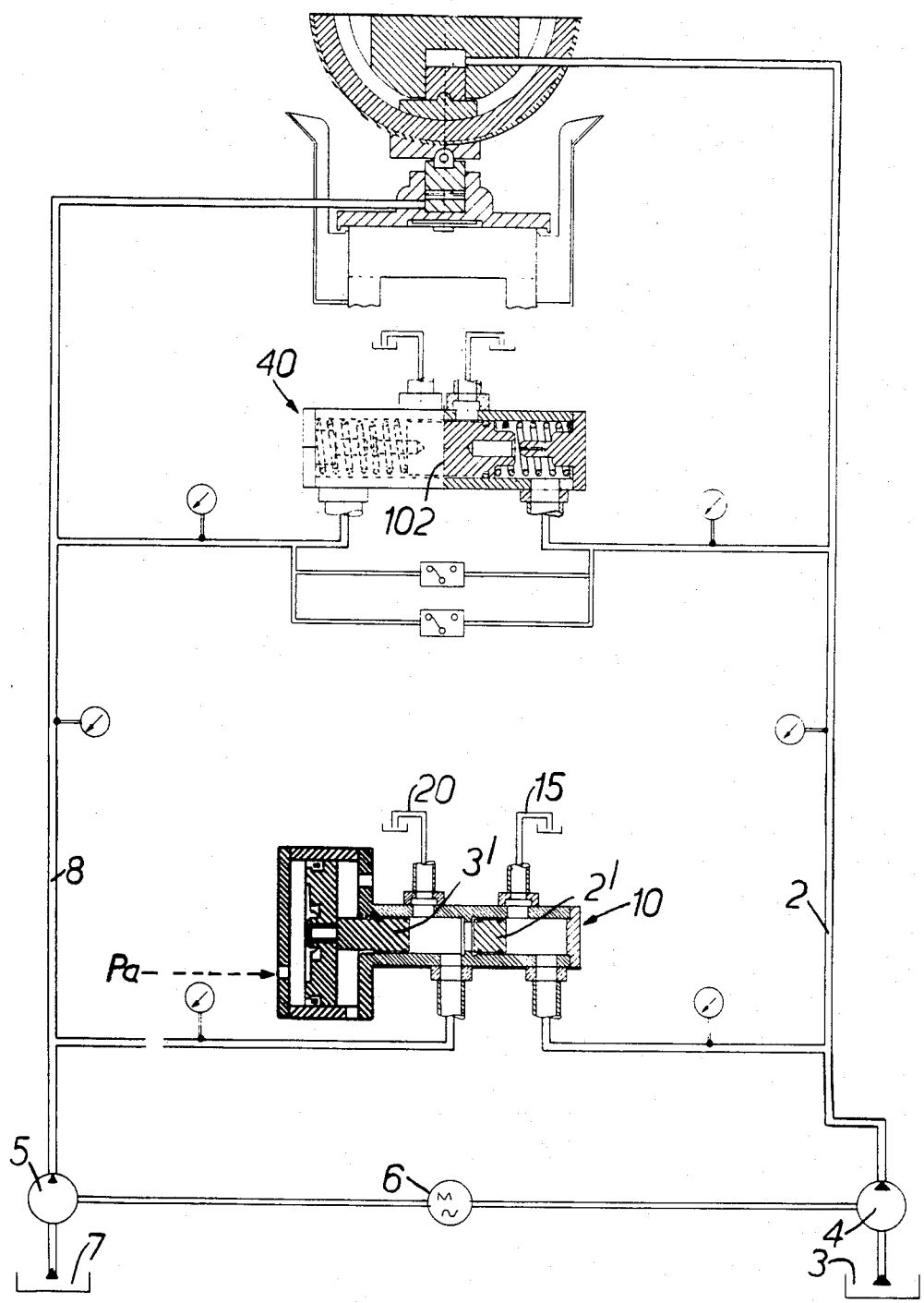
F I G.1

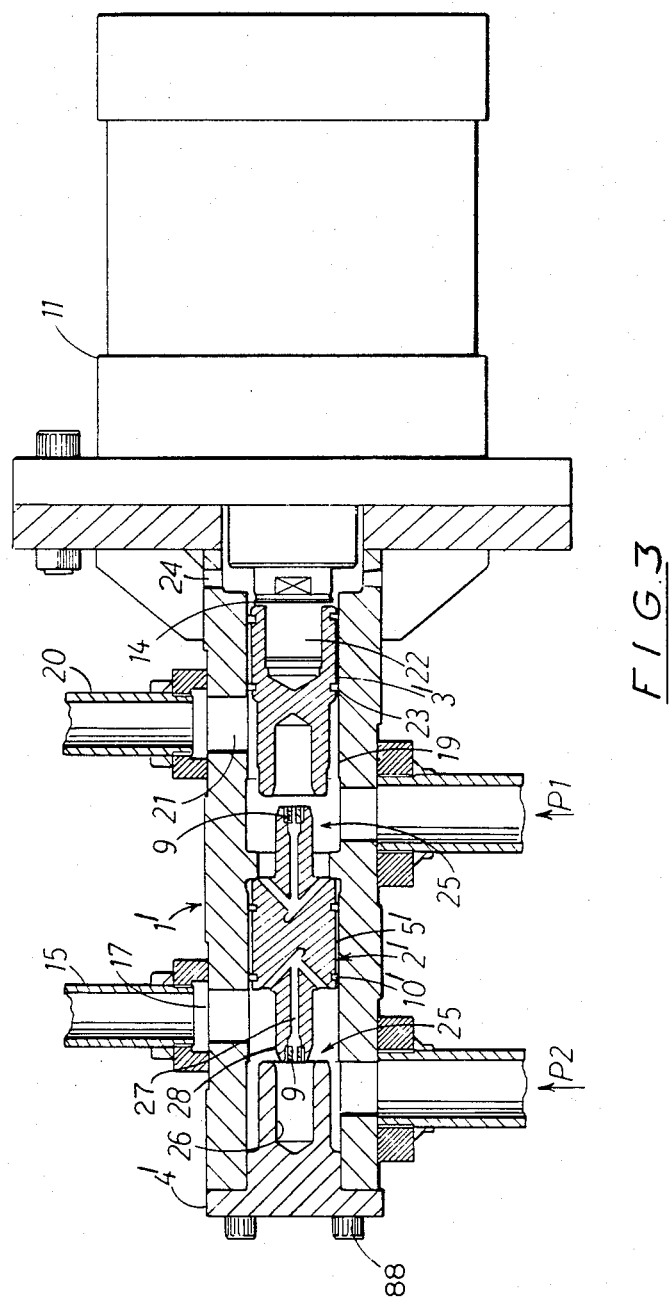

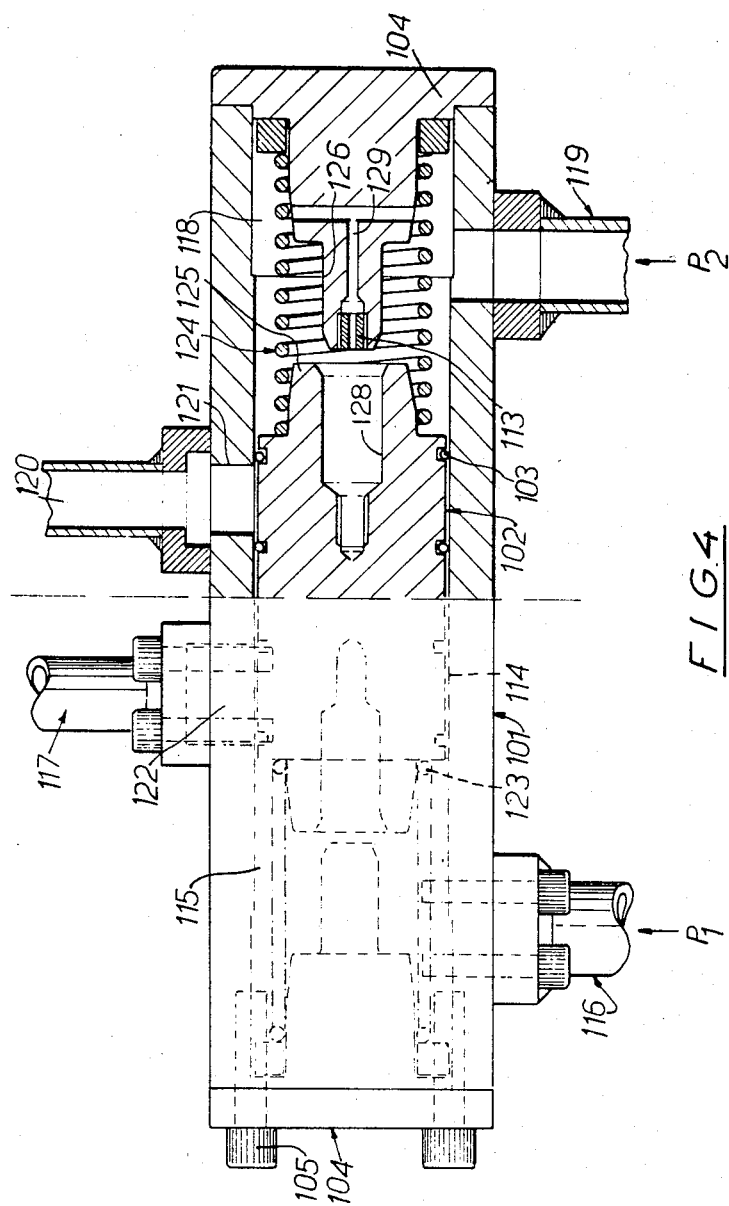

CONTROL OF FLUID PRESSURE CIRCUITS

DESCRIPTION

The present invention relates to a pressure balance control system for controlling the pressure in two separate fluid pressure circuits. The system has particular application in paper making for controlling the pressure circuits for the E.N.P. (Extended Nip Press) and C.C. Roll (Controlled Crown), such as in a calender roll.

An aim of the invention is to provide a safe control system which will maintain two circuits at a predetermined pressure relative to one another without mixing of the fluid contained in the two circuits.

According to one aspect of the present invention then a control system for controlling the pressure and pressure balance in two separate fluid pressure circuits comprising first and second fluid pressure circuits, a valve having a balance piston which is acted on by the fluid pressure existing in each of the first and second circuits and which controls the connection of one of the circuits to a relief line to thereby balance the pressure in the first and second circuits, the valve having a regulating piston which is acted on by a regulating pressure and by fluid pressure in the other of the circuits, means being provided to control the regulating pressure, and the regulating piston controls the connection of the other of said circuits to a relief line whereby the pressure in said other circuit is regulated to a pressure which is proportional to the regulating pressure applied to the regulating piston.

The hydraulic pressure in the system is related in a fixed proportion to the regulating pressure, and the ratio of the pressures will be in inverse proportion to the areas of the piston acted on by regulating pressure and fluid pressure in the circuits.

The regulating pressure may be either air or hydraulic pressure and the means to control the regulating pressure comprises either an air or hydraulic pressure regulator as appropriate. In the case of pneumatic control a control valve is provided by means of which zero air pressure or one of two pressure levels (high and low) may be selected. A regulator is provided for each of the two air pressures selected.

One application of the system is in paper making to control the pressure in the two fluid circuits for the E.N.P. and C.C. Rolls respectively. Zero air pressure corresponds to unloading of the E.N.P. and C.C. Roll, whilst high pressure corresponds to load mode and low pressure to the thread mode of operation.

In a preferred embodiment of the invention the system includes a balance valve which compensates for any out of balance between the two pressure circuits. The balance valve comprises a balance piston movable in a bore and subjected on its opposite ends to the fluid pressure in the first and second circuits. The piston controls connection of the first circuit to a relief line and connection of the second circuit to a relief line. Thus, any unwanted differential pressure between the two circuits causes the piston to be displaced to drain fluid from the higher pressure of the two circuits. A pair of springs may be provided to centralise the piston, in which position the two relief lines are closed off. Shock absorber means may be provided to resist movement of the piston as to avoid over reaction to minor pressure variations.

According to another aspect of the invention there is provided a valve for regulating and balancing the pressure in two fluid pressure systems, the valve comprising a valve body having a bore therein receiving a balance piston whose opposite ends are subjected to the fluid pressure in first and second fluid pressure systems, and which controls communication of the second pressure system with a relief line, a regulating piston received in a bore in the valve body and subjected at one end to fluid pressure in the first pressure system and acted on by a regulating pressure, said regulating piston controlling communication of the first pressure system with an associated relief line, the regulating piston serving to establish a regulated pressure in the first pressure system and the second piston serving to balance the pressure in the second pressure system relative to that regulated in the first pressure system.

The balance piston carries two spaced apart annular seals which isolate the fluid of the two systems and thus prevent mixing thereof. The regulating piston is preferably acted on by a pneumatic pressure whereby the pressure in the two fluid systems is related in a fixed ratio to the controlled pneumatic pressure. The regulating piston is in the form of a stepped piston or two pistons operatively coupled together. Adjustment of the pneumatic pressure gives rise to a corresponding increase or decrease in the pressure in the two fluid pressure systems. The pressure in the first system relates to the pneumatic pressure in inverse proportion to their corresponding piston areas.

According to another aspect of the present invention there is provided a balance valve for maintaining two fluid pressure systems at a predetermined pressure relative to one another, the valve comprising a valve body having a bore which receives a piston whose opposite ends are subjected to the fluid pressure in first and second fluid pressure systems, which systems are isolated from one another by the piston, each of the fluid pressure systems being provided with a relief line passage whose connection with its associated fluid pressure system is controlled by movement of the piston; any imbalance of forces acting on the piston causes it to be displaced in a direction to connect the fluid pressure systems associated with that side of the piston subjected to the higher force to its relief line to thereby effect a reduction in fluid pressure acting on that side of the piston to balance out the forces acting on the piston.

In one embodiment the balance valve is arranged to maintain the pressure in the two systems substantially equal. Thus, if a higher pressure exists in say the first system than in the second system, the piston will be displaced to connect the first system to its relief line allowing fluid to flow off until the pressure are equalised when the relief connection will be closed off. The piston carries sealing members to prevent the fluid of the first system mixing with the fluid of the second system.

In the preferred embodiment, the piston is acted on, at opposite ends by two springs. The force exerted by the springs on the piston may be equal in which case the valve serves to equalise the pressure in the two systems. Alternatively, the springs may be arranged to exert different pressure in which case the valve serves to maintain a differential pressure between the two systems.

Means is preferably provided to resist rapid movement of the piston in either direction. The means comprises a plunger movable in a blind bore, and an orifice which restricts the flow of fluid from the blind bore on introduction of the plunger into the bore. The amount of resistance can be changed by using different sized orifices. Each end of the piston is provided with such means.

A still further feature of the invention resides in the shape of the port which leads from the bore in the valve body to the relief line. This is preferably triangular in shape, such that initial movement of the piston uncovers only a small opening whilst further movement uncovers a progressively larger area in relation to the distance travelled.

The invention will now be described further, by way of example only, with reference to the accompanying drawings, in which:

FIG. 1 illustrates the hydraulic control schematic for a control system according to the invention.

Figure 1A:
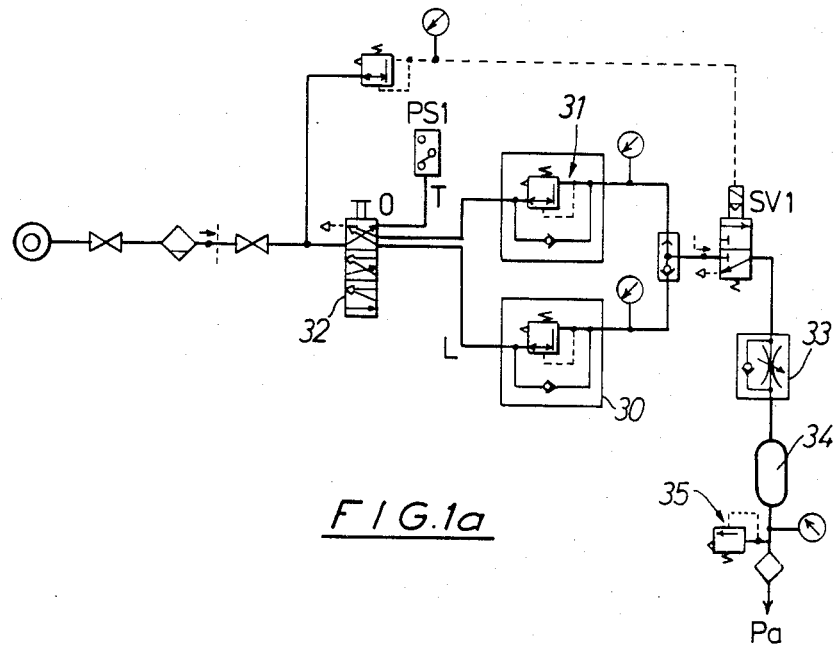
Figure 5:
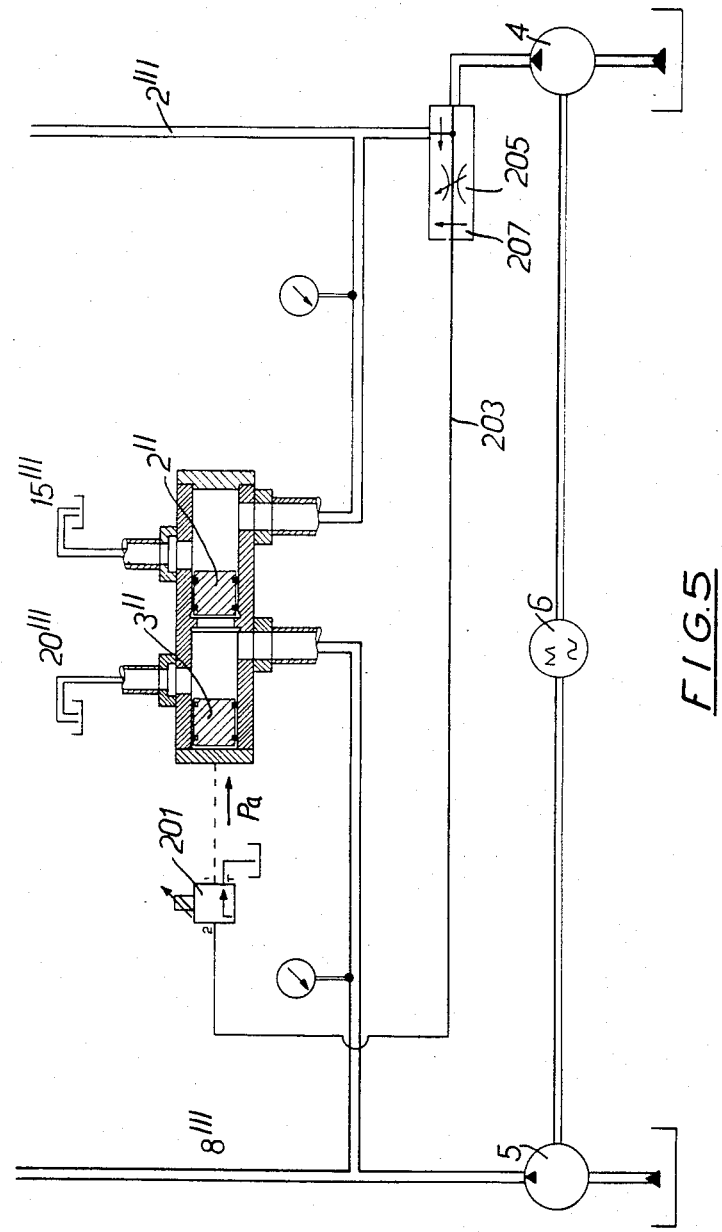
Figure 6:
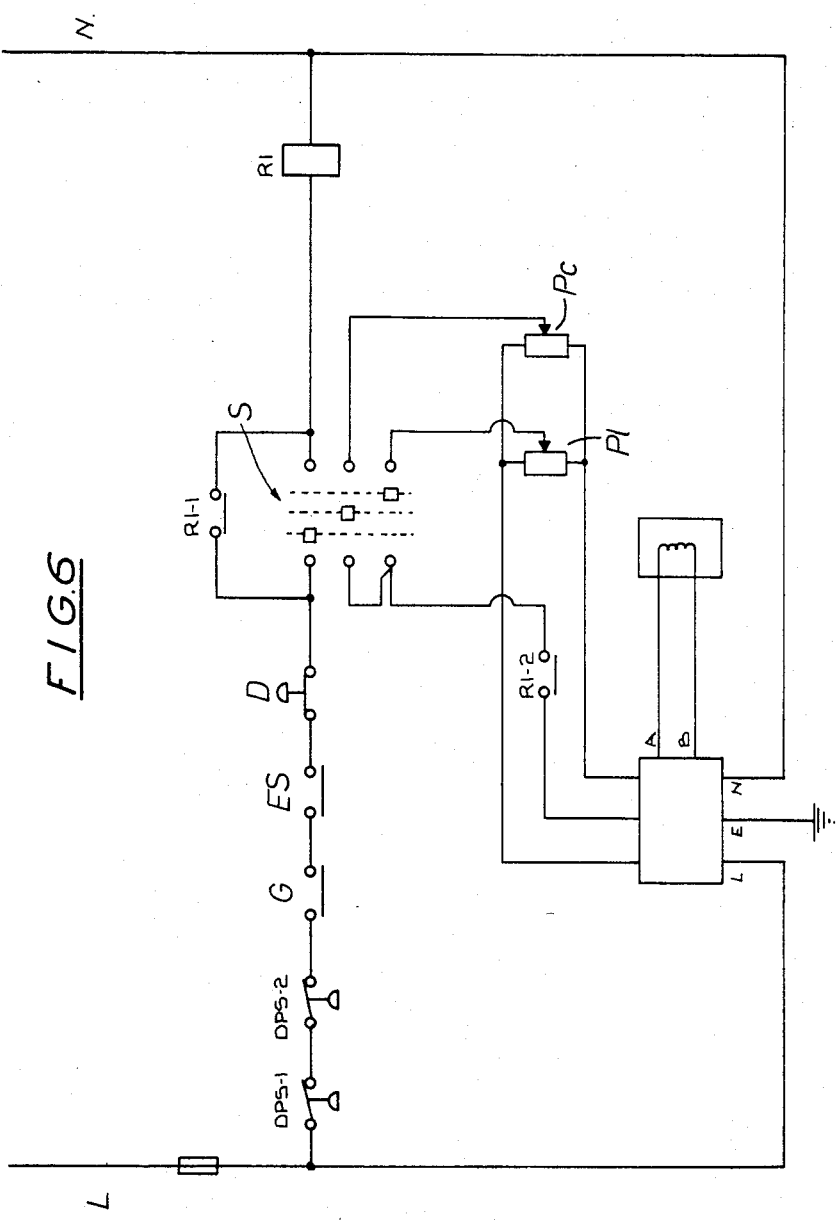

FIG. 1a illustrates the pneumatic control schematic for a control system according to the invention, FIG. 2 illustrates an electrical control schematic, FIG. 3 is a partial section of the balance and regulating pressure valve illustrated schematically in FIG. 1, FIG. 4 is a half section of the balance valve illustrated schematically in FIG. 1, FIG. 5 illustrates part of the hydraulic control schematic for a contact system having a modified pressure and balance regulator, and FIG. 6 illustrates the electrical control schematic for the embodiment of FIG. 5.

The control system of the present invention has particular application in paper making for controlling the pressure in the hydraulic circuits of the E.N. press (Extended Nip Press) and the C.C. calender roll. The two circuits have to be kept separate. The C.C. Roll circuit utilises oil as the pressure fluid and this oil serves a lubricating function for the roll and mixing with fluid from the E.N.P. circuit which may be contaminated with water is undesirable. It is an aim of the invention to maintain equal pressures in the E.N.P. and C.C. Roll circuits. The C.C. Roll circuit is indicated by the reference 2 and is fed with fluid from a reservoir 3 by a high pressure pump 4. The E.N.P. circuit is indicated by the reference 8 and is fed with fluid from a reservoir 7 by a high pressure pump 5. The pumps 4,5 are driven by a common motor 6.

Equal pressures are maintained in the two circuits by a pressure regulating and balance valve generally indicated at 10. The valve is illustrated in further detail in FIG. 3 and is described further hereinbelow. The valve comprises a regulating piston 3' and a balance piston 2'. The balance piston is subjected at opposite ends to the pressure in the C.C. Roll circuit and the E.N.P. circuit, whilst the regulating piston is subjected to the pressure in the E.N.P. circuit and a controlled air pressure Pa applied to a larger diameter portion of the regulating piston. The balance piston controls a connection between the C.C. Roll circuit and a relief line 15 leading to the reservoir 3, whilst the regulating piston 3' controls a connection between the E.N.P. circuit and a relief line 20.

A controlled air pressure is applied to the regulating piston 3' and this determines the pressure established in the E.N.P. circuit. The balance piston 2' serves to adjust the pressure in the C.C. Roll circuit so that it equals the pressure established in the E.N.P. circuit. The controlled air pressure is described further with reference to FIG. 1a.

The paper machine has three modes of operation: load; close and open. These modes of operation correspond directly to: high air pressure; low air pressure, and no air pressure. The high and low air pressures are each adjustable by respective air pressure regulators 30,31. A three position valve 32 controls the mode of operation and this can be either a solenoid operated valve or a manual valve. When solenoid operated a three position selector switch may be located on the bench board. A controlled restriction 33 and an air tank 34 is provided between the air controllers and the regulating piston 3' in order to damp the air pressure charges to the piston and avoid any quick pressure surges. A safety valve 35 is added to the system and this limits the maximum air pressure that can be applied to the piston. A dump valve SV1 is included in the system in order to respond to electrical interlocks. The air pressure control system is fed from an air supply and includes pressure gauges, air filter and air lubricator.

The system described heretofore is sufficient to achieve the desired pressure regulation and balance between the two circuits, but in order to increase the reliability of the system a balance valve, generally indicated as 40 in FIG. 1, is added to the system and positioned as close as possible to the E.N.P. and C.C. Roll.

The valve is described in greater detail hereinbelow with reference to FIG. 4. The valve responds to pressure differentials between the two circuits to establish the desired equilibrium. The valve comprises a valve body 101 accommodating a balance piston 102 which is subjected at opposite ends to the pressure in the E.N.P. circuit and C.C. Roll circuit. The piston controls connection of the E.N.P. circuit to a relief line 117 and connection of the C.C. Roll circuit to a relief line 120. The balance valve acts to protect the system in the event of failure of that function of the pressure and balance regulator, thus adding to the safety of the system.

As an additional safety precaution differential pressure switches DSP1, DSP2 are positioned close to the C.C. Roll and E.N.P. and these are arranged to unload the system should any excessive differential pressure occur due to both the balance valve and the pressure and balance regulator failing to equalise the pressure of both circuits.

An electrical control system is provided in order to unload the system automatically through the solenoid valve SV1 in the event of the following conditions arising: high differential pressure between E.N.P. and C. C. Roll circuits; triggering of the C.C. Roll gear box alarm (G); operation of the drive emergency stop (ES); and triggering of the emergency dump (D) by an operator. If any one of these interlocks has been triggered during load or thread the operator will have to manually return the mode of operation to unload before being able to apply thread or load condition.

Referring now to FIG. 3 the pressure regulating and balance valve is described in further detail. The valve has a valve body 1' with a bore 5' accommodating a balance piston 2'. The balance piston is subject at opposite ends to the fluid pressure P1 in a first fluid pressure system of the E.N.P. circuit and a fluid pressure P2 in a second fluid pressure system of the C.C. Roll circuit. The balance piston 2' controls communication of the second pressure system with an associated relief line 15. The relief line leads to a reservoir which is at a lower pressure than P2 and which is preferably at atmospheric pressure. Two seals 10' carried by the piston 2' isolate the fluid of the E.N.P. circuit from the fluid of the C.C. Roll Circuit and thereby prevent mixing of the two fluids. The balance piston is illustrated in a stop position in which a port 17 in the bore 5' is fully open. The port 17 is preferably triangular in shape such that movement of the piston 2' to the right uncovers a progressively larger area of port for a given increment of travel.

A regulating piston 3' is received in a bore 19 in the valve body. The regulating piston 3' is subjected to the fluid pressure P1 in the E.N.P. circuit and controls communication of that circuit with an associated relief line 20. The relief line 20 communicates with the bore 19 by way of a port 21. The regulating piston 3' is acted on by pneumatic air pressure and in the illustrated embodiment a pneumatic cylinder 11 is secured to the valve body and a piston disposed in the cylinder cooperates with the regulating piston 3' by way of a push rod 22. A pin 14 connects the push rod and regulating piston. The regulating piston 3' carries two seals 23. A vent port 24 is disposed between the regulating piston 3' and the piston of the pneumatic cylinder.

In the embodiment illustrated in FIG. 3 movement of the balance piston is resisted in both directions by shock absorber means 25. The provision of shock absorbers is optional and, for convenience, only one of the shock absorbers is described fully. The bore of the valve body remote from the pneumatic cylinder 11 is closed by a blanking plug 4' which is secured in position by screws 88. The blanking plug has a blind bore 26 which is dimensioned to receive a plunger 28 carried by one end of the balance piston 2'. A passageway 27 in the piston 2' connects the end of the plunger 28 to the second fluid pressure system. A sleeve 9 having a control orifice is disposed in the passageway 27. The size of the orifice may be varied in order to achieve the desired piston resistance. The shock absorber described resists movement of the balance piston in a direction to close the relief line 15. The other shock absorber resists movement of the balance piston in a direction to uncover the relief line 15. The plunger is formed on the balance piston and the blind bore is formed in the regulating piston 3'. It will be appreciated that the respective plungers 28 could be formed in the plate 4 and regulating piston 3 and the blind bore could be formed in the balance piston. The throttle orifice could be formed in the plug 4 or the regulating piston.

In operation air pressure acting on the pneumatic cylinder piston displaces the regulating piston to the left, as shown in FIG. 3, to close the relief line 20. Fluid pressure P1 introduced in the E.N.P. circuit acts on the regulating piston and is regulated to a pressure which is proportional to the ratio between the area of the regulating piston subjected to fluid pressure P1 and the area of the pneumatic piston subjected to a controlled air pressure. Thus, a change in the air pressure gives rise to a change in the pressure P1.

The pressure P1 in the E.N.P. circuit acts on the balance piston 2' to displace it to the left in FIG. 3, whilst the pressure P2 in the C.C. Roll circuit displaces it to the right. When the pressures P1 and P2 are equal the piston 2' closes off the port 17 of the relief line 15. If the pressure P2 rises the balance valve is displaced to the right, as illustrated in FIG. 3, uncovers the relief line and draining fluid to the reservoir until the pressures P1 and P2 are equalised. Fluid is supplied from respective pumps to the two systems at a pressure which ensures that the desired pressure can always be achieved in the two systems.

The shock absorbers 25 associated with the balance piston 2' restrict the movement of the balance piston and thus avoid oscillation or too rapid a response. The amount of restriction can be varied by changing the size of the orifice in the sleeve 9. Where no resistance is required the sleeve can be omitted.

The pneumatic air cylinder serves to damp any oscillation of the regulating piston.

Referring now to the drawing of FIG. 4, the balance valve 40 is described in further detail. The valve has a valve body 101 with a cylindrical bore 114 in which is received a piston 102. The bore in the valve body is closed off at each end by blanking plates 104 secured in position by bolts 105. The piston 102 carries sealing members 103 which isolate first and second fluid pressure systems from one another. One end of the piston 102 defines in part a first fluid chamber 115 which is fed with fluid under pressure by way of a connection 116. A relief line 117 opens into the bore 114. Similarly the other end of the piston defines in part a second chamber 118, forming part of the second fluid pressure system, and connected thereto by way of a line 119. A second relief line 120 opens into the bore 114 at a port 121. The port 122 of the first relief line 117 is triangular in shape. The port 121 is similarly shaped and in both cases the narrow end of the port is disposed adjacent to the end of the piston.

The valve body accommodates two springs 123, 124 and as illustrated in FIG. 4 the spring 123 is disposed between the end plate 104 and the left hand end of the piston 102 whilst the spring 124 is disposed between the right hand end of the piston 102 and the right hand end plate 104. Each end of the piston 102 is provided with a projecting nose 125 which serves to locate the respective spring coaxially thereof. Each of the end plates 104 has a stepped portion, a projection 126 of which is adapted to be received in a respective blind bore 128 formed in the nose 125 of the piston. The projection 126 is dimensioned to be a close tolerance fit in the bore 128. A passage 129 leads from the end of the projection 126 and communicates with the chamber 118. An annular sleeve 113 is inserted into the passage 129 and serves as a throttle the function of which will be described further hereinbelow. It will be appreciated that the projection 126 could be formed on the piston 102 and the bore 128 formed in the end plate 104.

The valve is symmetrical in its construction with the left hand half being a mirror image of the right hand half. The valve is illustrated in its equilibrium position in which the forces acting on the piston 102 are balanced. The force acting on the left hand end of the piston 102 is made up of the spring force plus the fluid pressure P1 in the E.N.P. circuit. The right hand end of the piston 102 is subject to the force of the spring 124 and the pressure P2 in the C.C. Roll circuit. Thus, where the spring forces are equal the piston will adopt the position illustrated when pressures P1 and P2 are also equal. If the pressure rises in fluid chamber 115 the piston 102 will be displaced to the right and the seal member 113 will uncover the port 122 leading to the relief line 117. Fluid will flow off from the E.N.P. circuit until the pressure in the E.N.P. circuit is substantially equal to the pressure in the C.C. Roll circuit whereupon the piston will move back to close off the port 122 under the influence of the spring 124. If the pressure were to drop in chamber 118 then the same movement would occur. If the pressure were to rise in chamber 118 then the piston would move to the left and fluid would be drained from the second system by way of the relief line 120. The relief lines 117 and 120 are connected to respective reservoirs which feed the two systems and these reservoirs will operate at a lower pressure than the higher pressure side which is being controlled. Typically the reservoirs are at atmospheric pressure.

It will be seen that when the piston moves to the right, as illustrated in FIG. 4, the projection 126 enters the blind bore 128 and movement of the piston is resisted because fluid cannot freely escape from the bore 128. The resistance offered is dependent on the size of the orifice 113 and the closeness of fit between the projection 126 and the bore 128. The resistance to movement can be changed by using different sizes of orifice in the throttle 113. As an alternative it is envisaged that needle valves can be used instead of the fixed orifices to allow the user to change easily the shock absorbing characteristics of the valve. The provision of shock absorbers is optional.

If the springs 123 and 124 exert equal forces on the piston in the position illustrated in FIG. 4 then the pressures P1 and P2 would be maintained substantially equal. If each of the springs 123 and 124 has a different spring characteristic, or if only one spring is included in the valve the pressures P1 and P2 in the two fluid systems can be maintained at a prefixed differential level without mixing of the fluids in the two systems. Thus the balance valve in this case acts as a differential pressure control valve. The provision of springs is optional. With the springs removed the valve controls the pressure to a zero differential condition. That is to say the piston will move as soon as there is any variation between the pressures P1 and P2, there being no spring pressure to overcome.

When the shock absorber is omitted the valve responds quickly to pressure changes. The movement of the piston can be controlled by the springs 123, 124 so that there is still some differential pressure between the systems while their pressures are controlled. A constant differential pressure can be maintained between the two systems by employing springs 123, 124 having different spring characteristics.

The pressure and balance regulator employed in FIG. 1 and shown in detail in FIG. 3 may be replaced by an alternative in which the regulating piston is hydraulically controlled. FIG. 5 shows part of the hydraulic control schematic for a control system having such a modified pressure balance regulator. The balance piston 2″ is substantially the same as that shown in FIG. 1 whilst the regulating piston 3″ is of plane cylindrical construction rather than of stepped diameter. The stepped diameter piston is rendered unnecessary where higher hydraulic pressures can be employed. The hydraulic pressure is applied to the end of the regulating piston 3″. A solenoid controlled valve 201 is provided to control the pressure applied to the regulating piston from a line 203 which branches from the line 2‴. A variable throttle 205 and a regulating valve 207 is provided in the line 203. Otherwise the circuitry and operation is the same as that described with reference to FIG. 1. FIG. 6 shows the electric control circuitry for the embodiment of FIG. 5 and is similar to that of FIG. 2 with the additional circuitry to operate the servo control valve to regulate the hydraulic pressure applied to the regulating piston to give high, low and zero pressure corresponding to the open, close and load operations.

A three position selector switch (S) contacts the mode of operation. In the close position a potentiometer (Pc) as shown in FIG. 6 controls the hydraulic pressure on the end of the pressure and balance controller via the servo control valve 201. On switching to the load condition a different potentiometer (Pl), as shown in FIG. 6, is used to control the load pressure.

Thus, an electrical signal applied to the servo control valve 201 regulates the hydraulic pressure at the end of the valve. This servo control valve allows an oil pressure to contact the piston 3″ to regulate the fluid pressure in one system 8‴ by opening or closing a drain port 20‴ connected to the systems reservoir. The movement of the piston across the drain port will regulate fthe pressure in system 1. The second piston 2″ regulates the pressure in system 2 by moving across the drain port 15‴ to a pressure equal to that in system 1 by virtue of the fact that the ends of the piston 2″ have equal areas.

I claim:

1. A control system for controlling the pressure and pressure balance in two separate fluid pressure circuits comprising a valve, a balance piston disposed within a bore in the valve body, the balance piston being acted on by the fluid pressure existing in each of the first and second fluid pressure circuits, a relief line for one of the circuits whose communication therewith is controlled by the balance piston to enable the pressure in the first and second circuits to be balanced, a regulating piston received in a bore in the valve body and acted on by a regulating pressure, a relief line being provided for the other of the circuits and being controlled by the regulating piston, and means being provided to control the regulating pressure such that the pressure in the other circuit is regulated to a pressure proportional to the regulating pressure applied to the regulating piston.

2. A control system according to claim 1 wherein air pressure is used as the regulating pressure and a pneumatic control system is provided comprising high and low pressure regulators and a three position valve by means of which the pressure applied to the regulating piston is controlled.

3. A control system according to claim 2 wherein a stepped diameter piston is employed as the regulating piston.

4. A control system according to claim 1 wherein hydraulic pressure is used as the regulating pressure and a three position selector switch is employed to control, by way of a servo control valve, the level of hydraulic pressure applied to the regulating piston.

5. A control system according to claim 1 wherein a balance valve is interposed between the first and second fluid pressure systems and comprises a balance piston which control respective connections to further relief lines of the first and second fluid pressure systems for maintaining the pressure in the two systems at a predetermined level relative to one another.

6. A control system according to claim 5 wherein shock absorber means is provided to resist movement of the balance valve piston in response to minor pressure fluctuations.

7. A control system according to claim 6 wherein a plunger and blind bore comprise the shock absorber means, the plunger being carried by one of a blanking plug fitted in the balance valve body and the balance valve piston and the blind bore being formed in the other of the balance valve piston and blanking plug.

8. A control system according to claim 1 wherein shock abosrber means is provided on the balance piston of the pressure and balance regulator valve for restricting movement of the balance piston in response to rapid pressure fluctuations.

9. A control system according to claim 1 wherein a respective pump supplies fluid pressure to the first and second fluid pressure circuits.

10. A control system according to claim 1 wherein a triangular shaped port is employed as the opening to the relief line controlled by the balance piston of the pressure and balance regulator valve.

* * * * *